United States Patent [19]

Kim

[11] Patent Number: 5,777,812
[45] Date of Patent: Jul. 7, 1998

[54] FIXED BIT-RATE ENCODING METHOD AND APPARATUS THEREFOR, AND TRACKING METHOD FOR HIGH-SPEED SEARCH USING THE SAME

[75] Inventor: Jae-hyun Kim, Suwon, Rep. of Korea

[73] Assignee: Samsung Electronics Co., Ltd., Kyungki-do, Rep. of Korea

[21] Appl. No.: 506,772

[22] Filed: Jul. 26, 1995

[30] Foreign Application Priority Data

Jul. 26, 1994 [KR] Rep. of Korea ........... 1994-18079
Mar. 23, 1995 [KR] Rep. of Korea ........... 1995-6219

[51] Int. Cl.$^6$ ........................................... G11B 5/09
[52] U.S. Cl. ................................... 360/48; 360/53
[58] Field of Search ....................... 360/77.13, 48, 360/72.2, 40, 39, 77.05, 77.06, 30; 358/335, 342; 371/242; 348/390, 403, 405, 408

[56] References Cited

U.S. PATENT DOCUMENTS

| | | | |
|---|---|---|---|
| 5,228,028 | 7/1993 | Cucchi et al. | 360/48 |
| 5,257,141 | 10/1993 | Matsumi et al. | 360/48 |
| 5,335,117 | 8/1994 | Park et al. | 360/48 |
| 5,341,250 | 8/1994 | Uchida et al. | 360/48 |
| 5,351,131 | 9/1994 | Nishino et al. | 360/48 |
| 5,384,665 | 1/1995 | Ohkuma et al. | 360/48 |
| 5,424,849 | 6/1995 | Yamashita et al. | 360/30 |
| 5,448,368 | 9/1995 | Rijckaert et al. | 360/48 X |
| 5,448,369 | 9/1995 | Lee et al. | 358/335 |
| 5,513,010 | 4/1996 | Kori et al. | 360/48 |

Primary Examiner—Aristotelis M. Psitos
Assistant Examiner—K. Wong
Attorney, Agent, or Firm—Sughrue, Mion, Zinn, Macpeak & Seas, PLLC

[57] ABSTRACT

In a fixed bit-rate encoding method, a unit block composed of a predetermined number of transform blocks is constructed by dividing input image data into transform blocks and a unit for fixing the bit-amount is constructed by extracting one of the predetermined number of unit blocks, to thereby perform transform-encoding. A real compression scale factor is calculated by quantizing the transform coefficient obtained by a transform-encoding operation according to initial compression scale factors and by comparing the bit-amount quantized in a unit block with a target bit-amount. The transform coefficient is quantized in a unit block using said real compression scale factor, and the quantized transform coefficient is variable-length-encoded to have the bit-amount fixed in an bit-amount fixing unit. The encoded DC coefficient and a predetermined number of low-frequency AC coefficients are recorded in an IDC data region and the all of the encoded coefficients are recorded in a DDC data region. The fixed bit-rate is easily performed by setting a bit-amount fixing unit as a cluster which is smaller than a frame. When the high-speed search operation is performed, information of the scanning position corresponding to each searching speed is scanned after scanning only the IDC region located in the leading end of the recording track, including most of the image information. Accordingly, most of the image information is reproduced even when the head does not scan the whole recording track.

17 Claims, 5 Drawing Sheets

TAPE TRAVELING DIRECTION

RECORDING TRACK

TAPE TRAVELING DIRECTION

RECORDING TRACK

TAPE TRAVELING DIRECTION

RECORDING TRACK

FIG. 4A  FIG. 4B
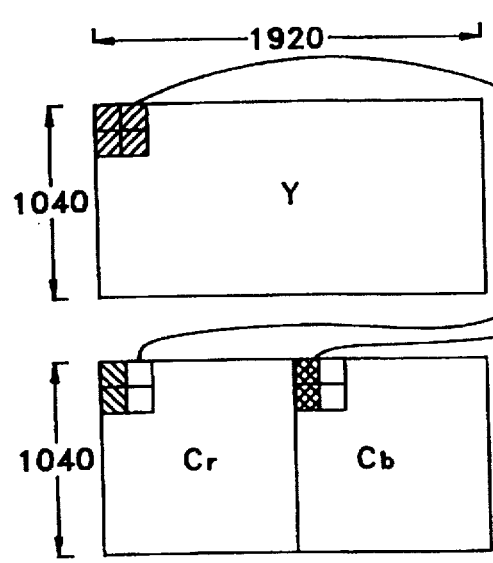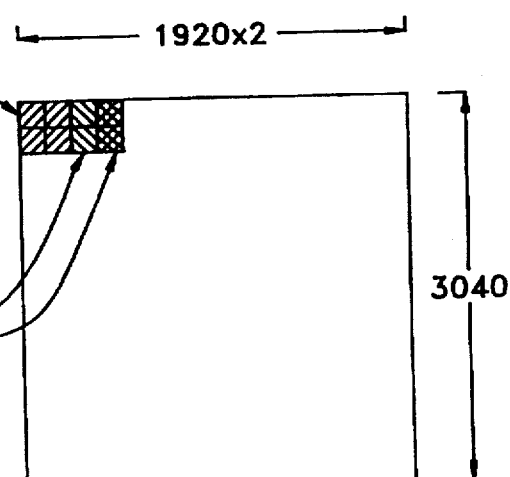
FIG. 4C
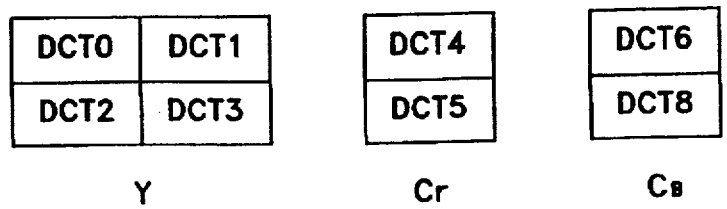
FIG. 4D
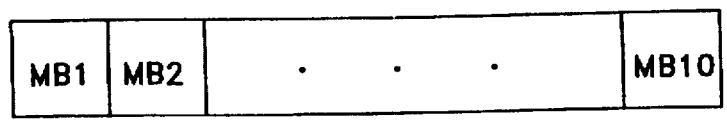

| 16 | 13 | 14 | 19 | 25 | 33 | 40 | 47 |
|---|---|---|---|---|---|---|---|
| 14 | 14 | 18 | 21 | 26 | 43 | 47 | 46 |
| 16 | 17 | 21 | 25 | 34 | 45 | 51 | 47 |
| 18 | 19 | 24 | 28 | 40 | 60 | 58 | 51 |
| 20 | 24 | 32 | 43 | 50 | 72 | 71 | 62 |
| 25 | 31 | 42 | 48 | 58 | 72 | 80 | 75 |
| 37 | 45 | 53 | 60 | 70 | 83 | 88 | 85 |
| 49 | 60 | 65 | 68 | 79 | 78 | 86 | 91 |

LUMINANCE MATRIX

| 16 | 17 | 21 | 34 | 62 | 63 | 64 | 66 |
|---|---|---|---|---|---|---|---|
| 17 | 18 | 24 | 45 | 63 | 64 | 66 | 68 |
| 21 | 23 | 41 | 63 | 64 | 66 | 66 | 68 |
| 34 | 44 | 62 | 63 | 64 | 66 | 68 | 69 |
| 60 | 62 | 63 | 64 | 65 | 67 | 69 | 73 |
| 62 | 63 | 64 | 65 | 67 | 69 | 73 | 78 |
| 62 | 63 | 64 | 66 | 68 | 72 | 77 | 84 |
| 63 | 64 | 67 | 68 | 72 | 77 | 84 | 91 |

CHROMINANCE MATRIX

FIXED BIT-RATE ENCODING METHOD AND APPARATUS THEREFOR, AND TRACKING METHOD FOR HIGH-SPEED SEARCH USING THE SAME

BACKGROUND OF THE INVENTION

1. Field of the Invention

The present invention relates to a fixed bit-rate encoding method and apparatus therefor, and a tracking method for performing a high speed search using the same. More particularly, it relates to a fixed bit-rate encoding method and apparatus therefor in which the high quality of an image is maintained during normal reproduction and the capacity of a high speed search is improved by fixing the code bit-amount in a cluster unit, and to a tracking method for the high speed search.

The instant application is based on Korean Patent Application Nos. 94-18079 and 95-6219 which are incorporated herein by reference for all purposes.

2. Discussion of Related Art

Recently, in an apparatus for transmitting/receiving image and audio signals, a technology has been used, whereby image and audio signals are transmitted, or stored in a memory, after encoding the image and audio signals as digital signals. Then, the signals are reproduced through a decoding operation. However, when the image signal is encoded as digital data, the amount of data is massive. Here, various encoding techniques are performed to reduce the total amount of data by removing redundancy in the digital image signal data. These techniques include transform coding, differential pulse code modulation, quantization, and variable-length encoding.

On the other hand, a magnetic recording density technology for high-density recording of the signal on a magnetic tape has been developed. However, due to the limitations of the magnetic recording density technology, it is difficult to record long segments of the digital image signal. Although, a digital videocassette recorder (DVCR) for compressing the digital image signal using the above-described data compressing method to increase recording time has been put to practical use.

The DVCR, however, generates many problems during high speed search operations, compared with an analog videocassette recorder. That is, in the case of a videocassette recorder adopting a helical scan method, since a reproducing head travels across a plurality of recording tracks for scanning during a high speed search, the signals recorded on the recording track are not completely reproduced. That is, only the data included in a portion of the tape held in contact between the recording track and head is reproduced. As a result, the quality of the image reproduced during the high speed search is deteriorated.

FIG. 1 shows the trace pattern of a head according to a conventional high speed searching method. In FIG. 1, the solid-lined arrows represent the head tracing path during a normal reproducing operation and the dotted-lined arrows represent the head tracing path during a triple-speed search operation. According to the high speed searching method shown in FIG. 1, since only a portion of each track scanned by the head is reproduced, only a partial image signal is reproduced.

FIG. 2 shows the trace of a head according to a conventional dynamic tracking method.

In FIG. 2, the head scans the first recording track along the first solid-lined arrow and passes two recording tracks along the dotted-lined arrows. Then, the head scans the fourth recording track. The triple-speed search is performed by repeating the above procedure.

Here, the dynamic tracking prevents deviation of the head from the recording track by changing the head position along the width of the track during the high speed search. Since the head is attached on the drum via a piezoelectric element or linear voice coil in the case of dynamic tracking, which is different from a general head which fixedly attached to a rotary drum, the head displacement is controlled by varying a voltage applied to the piezoelectric element or linear voice coil.

When N-times high speed searching is performed according to the dynamic tracking method, the head is controlled to scan one track (here, the first track) of the N continuous recording tracks. The capacity of the high speed searching method using the dynamic tracking is affected by the changeable displacement of the head which is determined by a mechanical structure. For example, supposing that a track pitch is W and the displacement of the track is $W(N-1)$, then an N times high speed search is possible.

However, the head should be controlled from a position of zero to a displacement of $W(N-1)$ in order to perform an N-times high speed search. Accordingly, the displacement value should be increased together with an increase in the searching speed for a DVCR system adopting the dynamic tracking method.

FIG. 3 shows head displacement according to the dynamic tracking method shown in FIG. 2.

In FIG. 3, a solid line A represents the trace of a head according to the dynamic tracking method and a solid line B represents the trace of a head according to the method shown in FIG. 1. As shown in FIG. 3, the head should move from a position of zero by a displacement of 2W (determined by $W(N-1)$), in order to perform triple-speed searching according to the dynamic tracking method. Thus, in the dynamic tracking method, the displacement value should be increased with an increase in searching speed. However, such an increase is limited by a mechanical structure, which causes a problem in that the searching speed of the dynamic tracking is restricted to a predetermined range.

When recording a high definition television signal (HDTV) on a DVCR, various limitations are accompanied by requirements for a high quality image, inter-frame editing, multiple copying, quick search, etc. To satisfy the above requirements, it is important for a predetermined amount of the compressed image signals measured in bits, to be maintained in a frame unit.

However, since the size of a frame image varies according to the particular image characteristics, an effective compression encoding method is required in the DVCR in which recording should be performed using frame units of a predetermined size, called a bit-amount, or in other words, the number of bits. Also, a bit-amount fixing unit (a code-amount fixing unit) related to image quality is contradictory to the capacity of the high speed search. Further, it is difficult for the compression encoding method having a predetermined bit-amount to be performed in the case where variable-length encoding should be employed. That is, a small bit-amount fixing unit is good for high speed searching, but lowers the efficiency of a variable-length encoder, thereby deteriorating the image quality.

On the other hand, a general bit-amount control method used for a moving picture, such as a feedback control for buffer regulation to prevent the compressed signal amount from exceeding an allowable value, cannot be used without modification in the DVCR for HDTV signals recorded and reproduced by intra-frame encoding. Therefore, an effective bit-amount fixing method is required which guarantees the performance of the high speed search, as well as providing for a high quality image during normal reproduction.

SUMMARY OF THE INVENTION

It is an object of the present invention to provide a fixed bit-amount encoding method and apparatus therefor in a DVCR for recording and reproducing an HDTV signal by employing an intra-frame encoding method, and also employing block shuffling and forward control of an adaptive quantizer.

It is another object of the present invention to provide an improved dynamic tracking method for performing a high speed search.

To achieve the above object, there is provided a fixed bit-rate encoding method for variable-length-encoding a transform coefficient produced by a predetermined transform function, for a recording medium, the method comprising the steps of: (a) constructing a unit block comprised of a predetermined number of transform blocks by dividing data of an input image signal into transform blocks and fixing a bit-amount by extracting a unit block located at a predetermined position within a frame of the image data; (b) transform-encoding the fixed bit-amount data constructed in said step (a) by the predetermined transform function and generating a transform coefficient; (c) calculating a real compression scale factor by quantizing the transform coefficient generated in said step (b) according to initial compression scale factors and by comparing the bit-amount quantized in the unit block with a target bit-amount; (d) quantizing the transform coefficient generated in said step (b) using said real compression scale factor; (e) variable-length-encoding the transform coefficient quantized in said step (d) to have the bit-amount fixed in a bit-amount fixing unit, and generating variable-length encoded transform coefficients having a DC coefficient and AC coefficients; and (f) recording the DC coefficient and a predetermined number of low-frequency AC coefficients produced in said step (e) in first data region and all coefficients encoded in said step (e) in a second data region of the recording medium.

A fixed bit-rate encoding apparatus according to the present invention, in which a fixed bit-rate encoding apparatus for variable-length-encoding a transform coefficient produced by a predetermined transform function, comprising: a blocking and shuffling unit for constructing a unit block comprised of a predetermined number of transform blocks by dividing data of an input image signal into transform blocks and a unit for fixing a bit-amount by extracting a predetermined number of unit blocks each located at predetermined positions within a frame of the image data; a transform encoder for transform-encoding the bit-amount fixing unit data constructed by said blocking and shuffling unit by said predetermined transform function and generating a transform coefficient; a first bit-amount analyzer for quantizing the transform coefficient output from said transform encoder using a predetermined number of initial compression scale factors, calculating the bit-amount encoded in unit block, and accumulating the calculated bit-amount in a bit-amount fixing unit;a normalizer for comparing the accumulated bit-amount with a target bit-amount by a compression rate, selecting one of the predetermined number of said initial compression scale factors, said normalizer being capable of outputting the bit-amount which is most approximately equal to the target bit-amount, and determining the selected initial compression scale factor as a reference compression scale factor; a multiple quantizer for quantizing the transform coefficient of the unit block using said reference compression scale factor and a predetermined number of compression scale factors which are approximately equal to the reference compression scale factor; a bit-amount evaluator for calculating a real compression scale factor for generating the bit-amount which is most approximately equal to the bit-amount of the unit block fixed in said blocking and shuffling unit by estimating the code length of the coefficients quantized by said multiple quantizer; a quantizer for quantizing the transform coefficient using said real compression scale factor; a variable-length encoder for variable-length-encoding the output of said quantizer to have a bit-amount fixed in a bit-amount fixing unit after zigzag-scanning; and a formatter for recording a DC coefficient and a predetermined number of low-frequency AC coefficients encoded by said variable-length encoder in a first data region of the recording medium and all coefficients encoded by said variable-length encoder in a second data region of the recording medium.

Also, there is provided a tracking method for a high speed search operation, for high-speed-searching the image signal recorded on the recording medium, wherein when a N times high-speed-searching is performed, a reproducing head scans the data of a scanning region (DDC region) corresponding to the speed of N times to the Nth track after scanning only the data of said IDC region of a predetermined recording track selected from N continuous recording tracks.

BRIEF DESCRIPTION OF THE DRAWINGS

The above objects and advantages of the present invention will become more apparent by describing in detail a preferred embodiment thereof with reference to the attached drawings in which:

FIGS. 4A–4D are diagrams showing a format of an image signal input to an encoding apparatus employing the fixed bit-rate encoding method according to the present invention;

DETAILED DESCRIPTION OF THE INVENTION

A video frame shown in FIG. 4A is comprised of a luminance signal Y and color difference signals Cr and Cb having a format ratio of 4:2:2.

In the case of a DVCR recording an HDTV signal, a chrominance component is used without employing sub-sampling in order to produce a high quality image. The luminance signal and color difference signal have resolutions of 1040×1920 and 1040×960, respectively.

FIG. 4B shows the video frame image data comprised of macroblocks. A macroblock, that is a unit block, is the basic unit for block shuffling and determining the quantization step size. Since the ratio of luminance to color difference signals is 4:2:2, a macroblock is comprised of eight discrete cosine transform (DCT) blocks (8×8) having four DCT blocks representing the luminance component and four DCT blocks representing the color difference component, as shown in FIG. 4C.

FIG. 4D shows a structure of a cluster, that is a bit-amount fixing unit, which is the basic unit for fixing the bit-amount and performing high-speed-searching. Here, a cluster is comprised of ten macroblocks.

According to the encoding method of the present invention, the bit-amount of the cluster is comprised of ten macroblocks and is encoded as a fixed bit-rate for easily obtaining the fixed bit-rate of a frame unit and distributing the quantizing noise over the entire frame.

Also, according to the encoding method of the present invention, the frame image data is shuffled in units of macroblocks for reducing the deviation of the bit-amount, according to the position within the frame image. This shuffling method effectively copes with burst errors.

Figures 5A, 5B, 7:
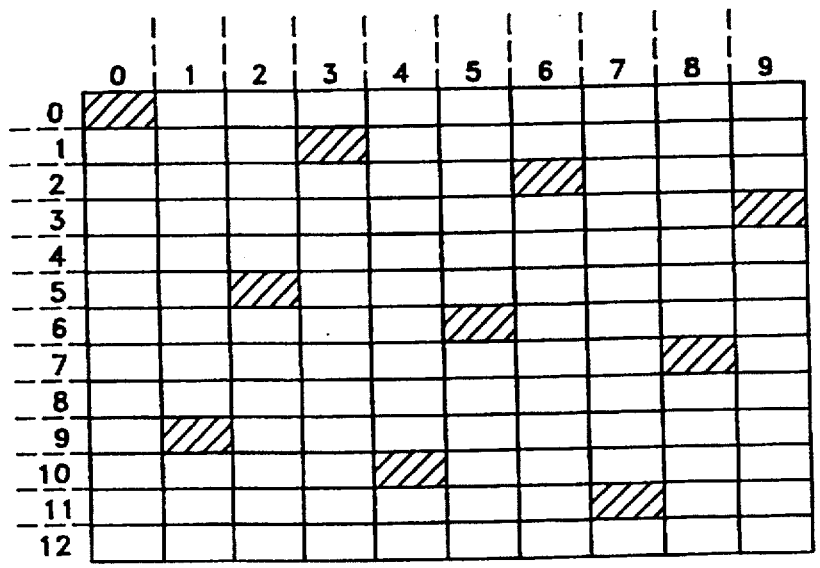
FIGS. 5A and 5B are diagrams for illustrating the shuffling step of the fixed bit-rate encoding method according to the present invention.
FIG. 7 is a diagram showing a quantization table used in the bit-amount analyzer and quantizer shown in FIG. 6.

FIGS. 5A and 5B are diagrams for illustrating the shuffling step of the fixed bit-amount encoding method according to the present invention. The frame image data shown in FIG. 4B is divided along the width of the frame into ten units and divided into thirteen units along the length, thereby obtaining 130 super-blocks, as shown in FIG. 5A. Each super-block consists of a 12×5 array of macroblocks as shown in FIG. 5B.

A cluster is formed by extracting one macroblock from each of the ten super-blocks shown in FIG. 5A. This is called block shuffling.

An example of block shuffling is described as follows. an arbitrary cluster C(i,k) is determined as follows, where each macroblock is denoted as MB:

$$C(i,k)=\{MB(i+10)\bmod n,4,k, \ MB(i+6)\bmod n,5,k,$$

$$MB(i+1)\bmod n,3,k, \ MB(i+2)\bmod n,6,k,$$

$$MB(i+5)\bmod n,2,k, \ MB(i+11)\bmod n,7,k,$$

$$MB(i+9)\bmod n,1,k, \ MB(i+7)\bmod n,8,k,$$

$$MB(+0)\bmod n,0,k, \ MB(i+3)\bmod n,9,k\} \quad (1)$$

for i={0, 1, . . . , n−1} and k={0, 1, . . . , 59}, and wherein n=12.

In formula (1), mod represents the modulus operation. Also, the first and second indices of the mod operator represent the position of a super-block in the array shown FIG. 5A. The third index represents the position of the macroblock in the corresponding super-block shown in FIG. 5B. The shaded blocks shown in FIG. 5A represent the super-blocks from each row in which a macroblock is extracted when a cluster is constructed.

Figure 6:
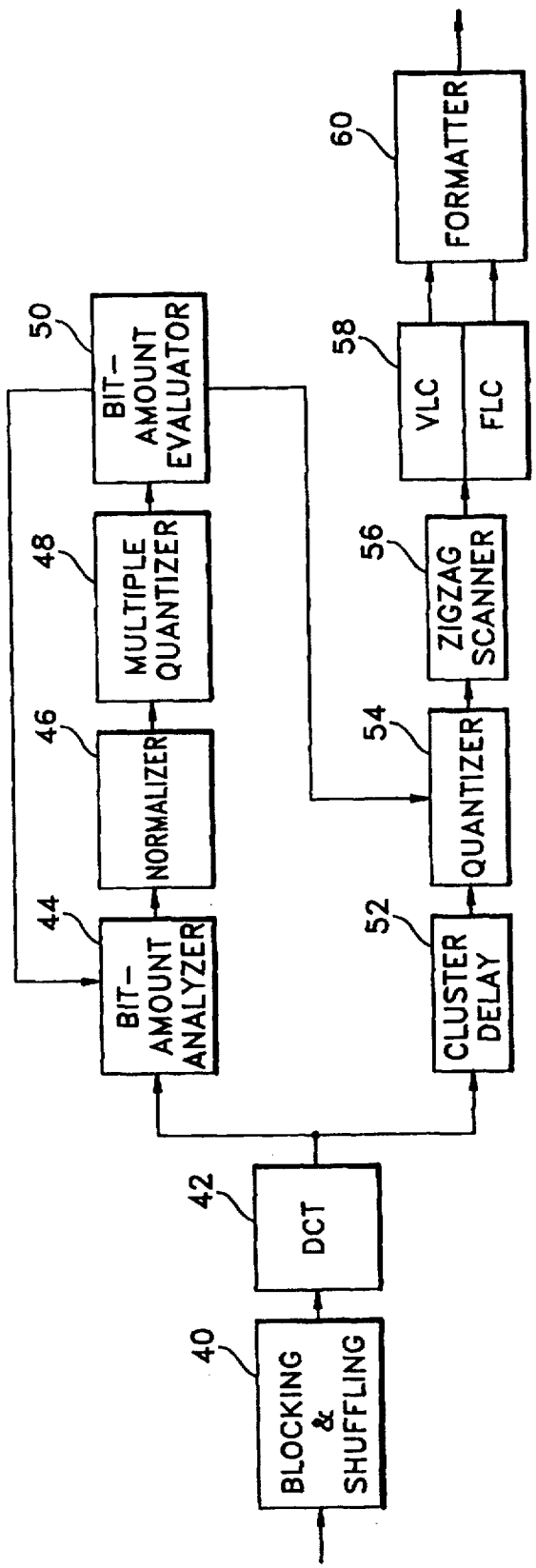
FIG. 6 is a block diagram of an encoding apparatus suitable for the fixed bit-rate encoding method according to the present invention.

FIG. 6 is a block diagram of an encoding apparatus suitable for the fixed bit-rate encoding method according to the present invention. The encoding apparatus of FIG. 6 includes, a blocking and shuffling unit 40 for constructing a cluster by extracting one macroblock from each of ten super-blocks located at a predetermined position in the frame after dividing the input image shown in FIGS. 4A–4D, 5A and 5B into DCT blocks. The apparatus also includes a DCT unit 42 for transform-encoding the image signal of a cluster unit output from blocking and shuffling unit 40, and outputting the result.

A pre-analyzing path for obtaining a real compression scale factor corresponds to blocks 44 through 50. In particular, a bit-amount analyzer 44 quantizes a transform coefficient output from DCT unit 42 using an initial compression scale factor, calculates the encoded bit-amount in a macroblock unit and accumulates the result in a cluster unit. A normalizer 46 calculates a compression scale factor suitable for the bit-amount to be assigned to each macroblock and a compression rate according to the bit-amount accumulated in a cluster unit by bit-amount analyzer 44. A multiple quantizer 48 performs quantization again using six compression scale factors which approximates the compression scale factor calculated by normalizer 46. A bit-amount evaluator 50 evaluates the quantization result output from multiple quantizer 48 and determines a real compression scale factor provided to the main path, in which a real quantization operation is performed.

The main path, in which real encoding is performed, is comprised of the units designated by blocks 52 through 60. The main path includes a cluster delay 52 for delaying the transform coefficient output from DCT unit 42 by as much as the cluster period, to thereby control timing between the pre-analyzing path and the main path. The main path also includes a quantizer 54 for quantizing the transform coefficient delayed by cluster delay 52, using the real compression scale factor calculated from bit-amount evaluator 50 of the pre-analyzing path. A zigzag scanner 56, zigzag-scans the quantized transform coefficient. A variable length encoder 58 variable-length-encodes the zigzag-scanned transform coefficient. A formatter 60 outputs the result output from the variable-length encoder to an independent decodable code (IDC) data region and a dependent decodable code (DDC) data region, respectively.

Next, referring to FIG. 7, operation of the encoding apparatus shown in FIG. 6 is described in detail below.

Blocking and shuffling unit 40 forms macroblocks having four luminance signal blocks and four color difference signal blocks by dividing the input frame image data into N1×N2 blocks (here, N1=8 and N2 =8), and forms a cluster by collecting the macroblocks extracted according to formula (1), from ten super-blocks distributed in the frame as shown in FIG. 5A.

DCT unit 42 transforms the 8×8 the cluster data blocks into frequency domain data blocks. Generally, the data transformation with respect to each block can be performed according to the following methods: a discrete cosine transform (DCT) function, a Walsh-Hadamard transform (WHT) function, a discrete Fourier transform (DFT) function, and a discrete sine transform (DST) function. In the present embodiment of the invention, the DCT method, which is the most widely adopted transform method for encoders, is employed.

Bit-amount analyzer 44 quantizes the transform coefficient output from DCT unit 42 using two initial compression scale factors (i.e., isf1 and isf2), calculates the encoded bit-amount in a macroblock unit and accumulates the result in a cluster unit. During this period, the data in the main path is delayed by cluster delay 52.

Normalizer 46 compares the bit-amount accumulated in a cluster unit, output from bit-amount analyzer 44, with a target bit-amount formed according to a predetermined compression rate, calculates the initial compression scale factor by which the bit-amount which most closely approximates the target bit-amount can be output, and determines the calculated initial compression scale factor as a reference compression scale factor (i.e. ref).

The reference compression scale factor is calculated according to formula (2) as shown below.

$$\text{ref} = [\text{Target Bits} | \text{isf1, isf2}] \quad (2)$$

$$sf \text{ Step bits} = \frac{CMB1_i - CMB2_i}{10(isf1 - isf2)} \quad (3)$$

$$MB\ dsf_i = \frac{0.1 \times \text{Assigned } MB \text{ bits}_i - SCMB_i}{sf \text{ Step bits}_i} \quad (4)$$

$$sf = rsf + MB\ dsf_i \quad (5)$$

for i=1, 2, . . . , 7800 (macroblocks/frame).

Formula (3) is for calculating the changed bit-amount (i.e., sf Step bits) of each macroblock when the compression scale factor changes by 0.1. Here, CMB represents the bit-amount of the macroblock encoded by the initial compression scale factor.

Meanwhile, in formula (4) SCMB represents the bit-amount of each macroblock encoded by the reference scale factor selected from two initial compression scale factors (i.e., isf1 and isf2). Formula (4) represents the changed amount of the compression scale factor (i.e., MB dsf1) to the difference between the bit-amount of an assigned macroblock calculated by formula (6) set forth below, and the bit-amount of macroblock encoded by the reference compression scale factor.

In formula (5), sf is a compression scale factor used in multiple quantizer 48, which is obtained by summing the reference compression scale factor (i.e., rsf) and the changed amount of the compression scale factor (i.e., MB dsf1).

Normalizer 46 assigns the bit-amount to be encoded to each macroblock in a cluster unit comprised of ten macroblocks encoded using the reference compression scale factor. The bit-amount to be assigned to each macroblock in a cluster is determined according to formula (6) shown below.

$$\text{Assigned } MB \text{ bits} = \frac{\text{Pre-analyzed } MB \text{ bits} \times \text{Target Cluster bits}}{\text{Pre-analyzed Cluster bits}} \quad (6)$$

wherein 'Target Cluster Bits' is set, for example, to 10,240 bytes for a ¼ compression factor. Also, the bit-amount is controlled by the result of bit-amount analyzer 44 and is used when the real bit-amount of the cluster is excessive or insufficient.

Multiple quantizer 48 performs quantization of a macroblock unit according to each of the compression scale factors, using the compression scale factor obtained according to formula (5) and six compression scale factors which are approximations of the above obtained compression scale factor.

Bit-amount evaluator 50 selects a real compression scale factor (i.e., sf) for generating the bit-amount which most closely approximates the bit-amount of the assigned macroblocks by estimating the code length of the coefficient quantized by multiple quantizer 48. Here, the real compression scale factor (i.e., sf) ranges from 2.00 to 7.00 and is encoded as nine bits in every macroblock. The real compression scale factor determined by bit-amount evaluator 50 is sent to quantizer 54 in the main path, in which real quantization is performed, and quantizer 54 quantizes the transform coefficient output from cluster delay 52 after being delayed.

FIG. 7 is a diagram showing a quantization table used in the bit-amount analyzer and quantizer shown in FIG. 6. Different quantization tables were used according to the luminance and color difference components.

The quantization table used for the compression encoding method recommended by the Joint Picture Engineering Group (JPEG) and Moving Picture Engineering Group (MPEG) is not suitable for a DVCR for recording/reproducing HDTV signals having a higher bit compression ratio. Thus, in the present invention, a quantization table suitable for a DVCR incorporating a lower compression ratio and which utilizes characteristics of the human visual system, is used.

According to a general method for fixing the bit-rate, more quantization noise is introduced by enlarging the quantizing step size for a high frequency component, since the quantization noise of the high frequency component is less sensitively detected compared with that of a low frequency component, which corresponds to a characteristic of the human visual system. Accordingly, DCT coefficients are quantized by the quantization step size which is determined by the complexity of the frequency domain transform coefficient.

However, the present invention provides a more effective bit-amount fixing algorithm in which the quantizing noise of each macroblock is evenly distributed over an entire frame, which is different from the above method of enlarging the quantizing step size together with an increase in frequency. A cluster composed of ten macroblocks is constructed for evenly distributing the quantization noise over the entire frame in the range of the given bit-amount (i.e., 10,240 bytes for ¼ compression).

Thus, the quantization step size QAC(i,j) which is applicable to the encoding of the present invention, is calculated as follows.

$$QAC(i,j) = \frac{P2^{sf}AC(i,j)}{qQ(i,j)} \quad (7)$$

for i={1, 2, . . . , 8} and j={1, 2, . . . , 8} and wherein p and q are adjustment parameters, the equation for Q(i,j) produces the quantization table shown in FIG. 7, where sf is the real compression scale factor ranging from 2.0 to 7.0.

Zigzag scanner 56 zigzag-scans the quantized transform coefficient output from quantizer 54.

Variable-length encoder 58 divides the quantized coefficient output from zigzag scanner 56 into direct current (DC) and alternating current (AC) components and encodes the coefficients according to a Huffman code. For example, the 0th (DC coefficient) and the 1st and 2nd coefficients (AC coefficients) after zigzag scanning are fixed-length-encoded as eleven bits, respectively, and the remaining coefficients (3th to 63th AC coefficients) are variable-length-encoded.

Here, the DC coefficient is independently encoded by pulse code modulation, not by a differential pulse code modulation in which encoding is performed with a difference value from the DC value of the neighboring block. The AC coefficient is variable-length-encoded. That is, the AC code is expressed according to the following formula (8), and is classified into eleven categories, respectively.

$$AC \text{ code} = \frac{\text{Codeword}}{\text{Run/Size}} + \frac{\text{Sign Bit} + \text{Additional Bit}}{\text{Extra Bit}} \quad (8)$$

Variable-length encoder 58 calculates the difference between the encoded code length output from each macroblock and the assigned bit-amount, transfers the bit-amount corresponding to the difference to the next macroblock and finally fixes the bit-amount in a cluster unit.

Formatter 60 receives the result of encoding performed by variable-length-encoder 58 and outputs the result to IDC and DDC data regions of the tape, respectively.

Figure 8:
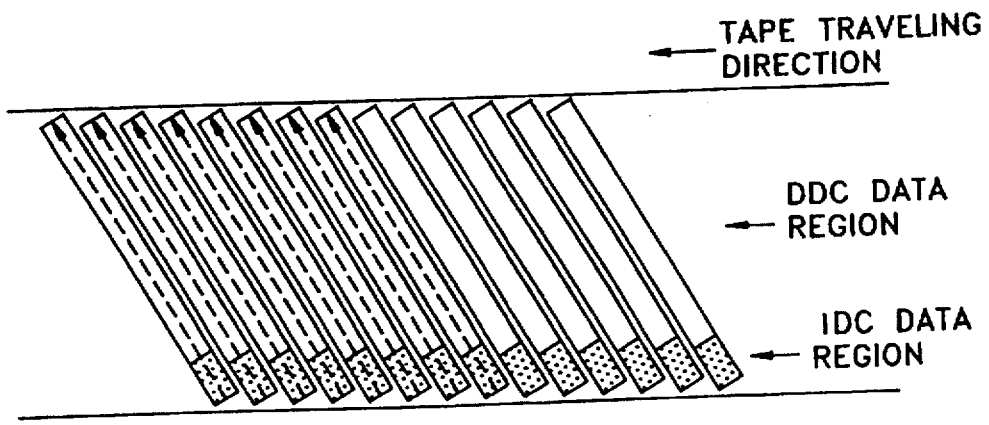
FIG. 8 is a diagram showing head tracing when a tape on which an output signal of the formatter shown in FIG. 6 is recorded is normally reproduced.

FIG. 8 shows a trace of a head when a tape, whose output signal is recorded in the IDC and DDC data regions, is normally reproduced. The tape in which the output signal of formatter 60 is recorded has the IDC data region located at the leading end of a recording track and has the DDC data region located after the IDC data region.

According to the present invention, after collecting the DC component and several low frequency AC components (i.e., the 0th, 1st and 2nd coefficients after the zigzag scanning), the collected components are arranged in the IDC data region, and the DC component and all AC components are arranged in the DDC data region of a cluster unit.

Also, according to the present invention, as in the prior art, the DC components and several low-frequency AC components can be recorded in the IDC data region, and the remaining AC components can be recorded in the DDC data region.

Figure 9:
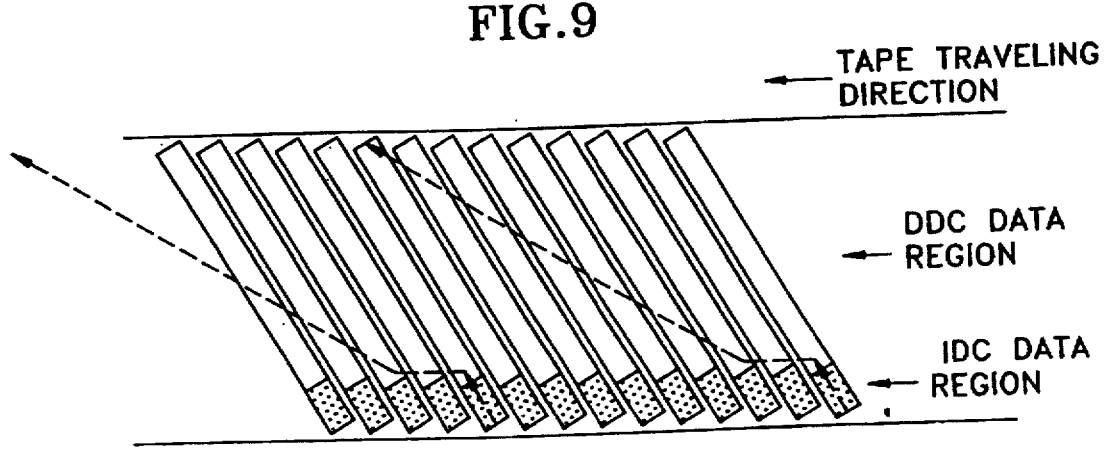
FIG. 9 is a diagram showing head tracing according to a tracking method for a high-speed search operation of the present invention.

FIG. 9 is a diagram showing a trace of a head according to an improved tracking method to which the encoding method and apparatus according to the present invention are applied.

Figure 1:
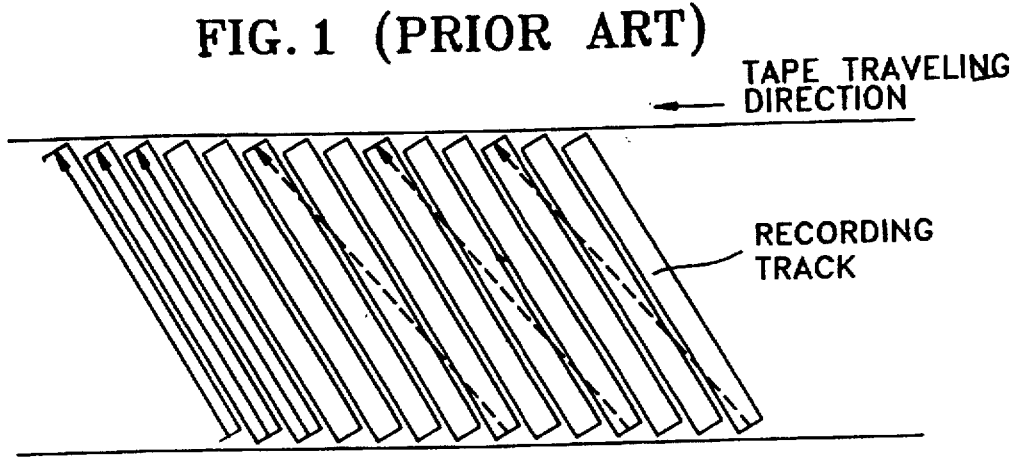
FIG. 1 is a diagram showing head tracing according to a conventional high-speed searching method.
Figure 2:
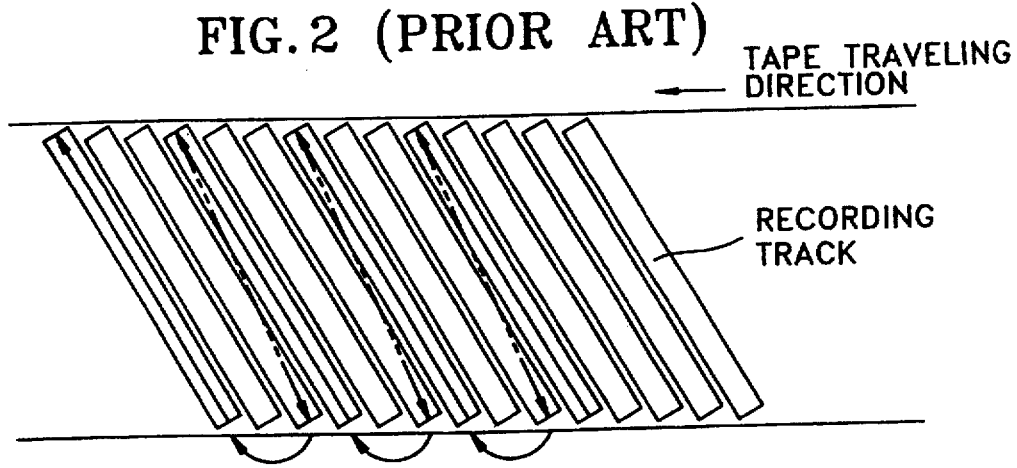
FIG. 2 is a diagram showing head tracing according to a conventional dynamic tracking method.
Figure 3:
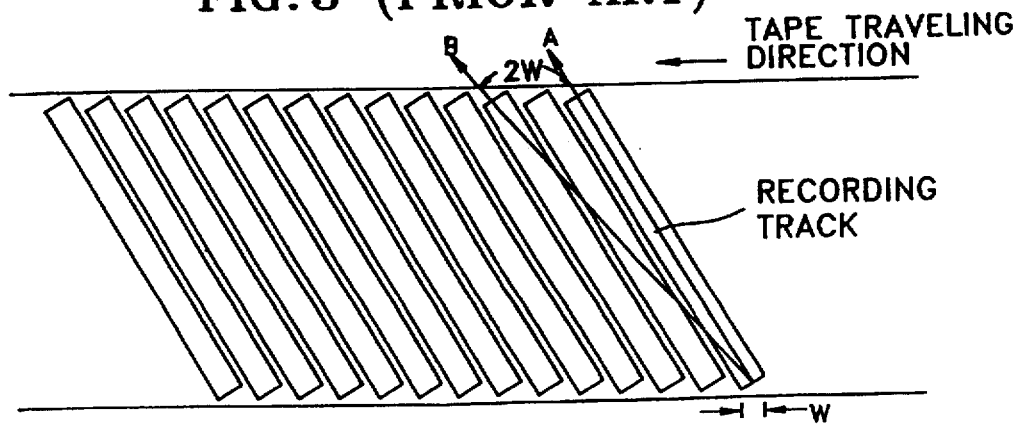
FIG. 3 is a diagram showing head displacement according to the dynamic tracking method shown in FIG. 2.

When an N-times high speed search is preformed, first, information recorded in the IDC region of the first of N continuous recording tracks is scanned by changing the head position along the track width, as in the case of the dynamic tracking method. Then information recorded in the DDC region of the scanning position, corresponding to each speed, is scanned as shown in FIG. 1, so that DDC information can be read and IDC information can be recorded in the leading end of the recording track. As a result, the quality of the reproduced image is improved during the high speed search, since IDC information, which contains important information, can be read and compared with the conventional tracking method shown in FIG. 1. Also, the problem caused by the conventional tracking method, in that the searching speed is limited by the maximum displacement of head, can be overcome.

As described above, according to the fixed bit-rate encoding method of the present invention, the fixed bit-rate is easily achieved since the unit for fixing the bit-amount is set as a cluster which is smaller than the frame unit, and the quantization noise is distributed by shuffling the frame image data.

Also, according to the present invention, the DC component and the low-frequency AC components are recorded in the leading end of the recording track, and all components are continuously recorded in a portion following the leading end of the track. When the high speed search is performed, the information of the scanning position, corresponding to each searching speed, is scanned after scanning only the IDC region located in the leading end of the recording track, which includes most of the image information. As a result, by adopting the fixed bit-rate encoding method of the present invention, most of the image information is reproduced even when the head does not scan the entire recording track, and the limitation of the searching speed according to the maximum displacement of the head can be overcome.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A fixed bit-rate encoding method for variable-length-encoding a transform coefficient produced by a predetermined transform function, to record on a recording medium, said method comprising:

(a) constructing a unit block comprised of a predetermined number of transform blocks by dividing data of an input image signal into transform blocks and constructing a bit-amount fixing unit by extracting one of the transform blocks from the unit block, wherein the unit block is located at a predetermined position within a frame of the image data;

(b) transform-encoding the fixed bit-amount data constructed in (a) by the predetermined transform function and generating a transform coefficient;

(c) calculating a real compression scale factor by quantizing the transform coefficient generated in (b) according to initial compression scale factors and by comparing the bit-amount quantized for the transform coefficient with a target bit-amount;

(d) quantizing the transform coefficient generated in (b) using said real compression scale factor;

(e) variable-length-encoding the transform coefficient quantized in (d) to have the bit-amount fixed with respect to the bit-amount fixing unit, and generating variable-length encoded transform coefficients having a DC coefficient and AC coefficients; and (f) recording the DC coefficient and a predetermined number of low-frequency AC coefficients generated in (e) in a first data region and recording a predetermined number of high-freauency AC coefficients generated in (e) in a second data region of the recording medium.

2. A fixed bit-rate encoding method as claimed in claim 1, wherein (a) comprises:

(a-1) dividing said image signal data into a plurality of discrete cosine transform (DCT) transform blocks;

(a-2) forming the unit block by combining a plurality of neighboring ones of the transform blocks produced in (a-1); and (a-3) forming a bit-amount fixing unit by combining a transform block from each of a plurality of unit blocks which are separated by a distance within the frame of image data according to the result of (a-2).

3. A fixed bit-rate encoding method as claimed in claim 1, wherein (c) comprises:

(c-1) quantizing the transform coefficient generated in (b) using a predetermined number of the initial compression scale factors, calculating the encoded bit-amount, and accumulating the calculated bit-amount in a bit-amount fixing unit;

(c-2) comparing the accumulated bit-amount with a target bit-amount determined according to a compression rate, selecting one of the predetermined number of said initial compression scale factors which produces the bit-amount most approximately equal to said target bit-amount, and determining the selected initial compression scale factor as a reference compression scale factor;

(c-3) quantizing the transform coefficient using said reference compression scale factor and a predetermined number of compression scale factors which are approximately equal to said reference compression scale factor; and (c-4) calculating a real compression scale factor for generating the bit-amount which is most approximately equal to an assigned bit-amount of the transform block by estimating the code length of the coefficients quantized in (c-3).

4. A fixed bit-rate encoding method as claimed in claim 1, wherein the transform coefficient recorded in said first data region is fixed-length-encoded in (e).

5. A fixed bit-rate encoding method as claimed in claim 1, wherein said first data region is an independent decodable code (IDC) data region, and said second data region is a dependent decodable code (DDC) data region.

6. A fixed bit-rate encoding method as claimed in claim 5, wherein when a N times high-speed-searching operation is performed, a reproducing head scans the data of a scanning region (DDC region) corresponding to the speed of N times to the Nth track after scanning only the data recorded in said IDC region of a predetermined recording track selected from N continuous recording tracks.

7. A fixed bit-rate encoding method as claimed in claim 1, wherein in (f), the DC coefficient and predetermined number of low-frequency AC coefficients encoded in (e) are recorded in an independent decodable code (IDC) data region and the remaining AC coefficients are recorded in a dependent decodable code (DDC) data region of the recording medium.

8. A fixed bit-rate encoding method as claimed in claim 1, wherein the recording medium is a magnetic tape.

9. A fixed bit-rate encoding method as claimed in claim 1, wherein in (f) the DC coefficient and all the AC coefficients generated in (e) are recorded in the second data region of the recording medium.

10. A fixed bit-rate encoding apparatus for variable-length-encoding a transform coefficient produced by a predetermined transform function, comprising:

a blocking and shuffling unit for constructing a unit block comprised of a predetermined number of transform blocks by dividing data of an input image signal p to transform blocks and constructing a bit-amount fixing unit by extracting one of the transform blocks from a predetermined number of unit blocks each located at predetermined positions within a frame of the image data;

a transform encoder for transform-encoding the bit-amount fixing unit data constructed by said blocking and shuffling unit by said predetermined transform function and generating a transform coefficient;

a first bit-amount analyzer for quantizing the transform coefficient output from said transform encoder using a predetermined number of initial compression scale factors, calculating the encoded bit-amount, and accumulating the calculated bit-amount in the bit-amount fixing unit;

a normalizer for comparing the accumulated bit-amount with a target bit-amount determined according to a compression rate, selecting one of the predetermined number of said initial compression scale factors, said normalizer being capable of outputting the bit-amount which is most approximately equal to the target bit-amount, and determining the selected initial compression scale factor as a reference compression scale factor;

a multiple quantizer for quantizing the transform coefficient using said reference compression scale factor and a predetermined number of compression scale factors which are approximately equal to the reference compression scale factor;

a bit-amount evaluator for calculating a real compression scale factor for generating the bit-amount most approximately equal to an assigned bit-amount of the transform block by estimating the code length of the coefficients quantized by said multiple quantizer;

a quantizer for quantizing the transform coefficient using said real compression scale factor;

a variable-length encoder for variable-length-encoding the output of said quantizer to have a bit-amount fixed with respect to the bit-amount fixing unit after zigzag-scanning; and a formatter for recording a DC coefficient and a predetermined number of low-frequency AC coefficients encoded by said variable-length encoder in a first data region of the recording medium and recording a predetermined number of high-freauency AC coefficients encoded by said variable-length encoder in a second data region of the recording medium.

11. A fixed bit-rate encoding apparatus claimed in claim 10, wherein said first data region is an independent decodable code (IDC) data region, and said second data region is a dependent decodable code (DDC) data region.

12. A fixed bit-rate encoding apparatus as claimed in claim 10, wherein said formatter records the DC coefficient and the predetermined number lowfrequency AC coefficients encoded by said variable-length encoder in an independent decodable code (IDC) data region of the recording medium, and records the remaining AC coefficients in a dependent decodable code (DDC) data region of the recording medium.

13. A fixed bit-rate encoding apparatus as claimed in claim 10, further comprising a delay unit for outputting the transform coefficient to said quantizer after delaying the transform coefficient of the bit-amount fixing unit of said transform encoder until the real compression scale factor is calculated by said bit-amount evaluator.

14. A fixed bit-rate encoding apparatus as claimed in claim 10, wherein the formatter further records the DC coefficient and all-the AC coefficients encoded by said variable-length encoder in the second data region of the recording medium.

15. A recording medium for storing variable-length encoded transform coefficients of a macroblock including a DC coefficient and a plurality of AC coefficients, comprising:

a first recording region for storing the DC coefficient and a predetermined number of low-frequency AC coefficients of the variable-length encoded transform coefficients from among the plurality of AC coefficients; and a second recording region for storing the DC coefficient and the plurality of AC coefficients.

16. The recording medium claimed in claim 15, wherein said first recording region is an independent decodable code (IDC) data region, arid said second recording region is a dependent decodable code (DDC) data region.

17. The recording medium claimed in claim 16, wherein said predetermined number of low-frequency AC coefficients is less than the number of AC coefficients of the plurality of AC coefficients.

* * * * *